United States Patent [19]

Lukens, Jr. et al.

[11] 4,243,644

[45] Jan. 6, 1981

[54] PROCESS TO SYNTHESIZE AMMONIA

[75] Inventors: Herbert R. Lukens, Jr., La Jolla; Donald P. Snowden; Richard L. Voigt, both of San Diego, all of Calif.

[73] Assignee: IRT Corporation, San Diego, Calif.

[21] Appl. No.: 48,224

[22] Filed: Jun. 13, 1979

[51] Int. Cl.$^3$ .............................................. C01C 1/00
[52] U.S. Cl. ................................................ 423/352
[58] Field of Search ........................................ 423/352

[56] References Cited

U.S. PATENT DOCUMENTS

| | | | |
|---|---|---|---|
| 269,309 | 12/1882 | Mond | 423/352 |
| 1,229,611 | 6/1917 | Hersman | 423/352 |
| 1,465,310 | 8/1923 | Nelson | 423/352 |
| 1,480,291 | 1/1924 | Nelson | 423/352 |

*Primary Examiner*—Wayne A. Langel
*Attorney, Agent, or Firm*—Fitch, Even, Tabin, Flannery & Welsh

[57] ABSTRACT

A method is described for producing ammonia. A catalyst is produced by heating a mixture of carbon and magnesium above the melting point of magnesium in an inert atmosphere. The melt thereby produced is cooled and pulverized. Exposing the catalyst thereby produced to humid air results in production of ammonia. The addition of aluminum or zirconium to the mixture enhances the productivity of the catalyst.

8 Claims, No Drawings

PROCESS TO SYNTHESIZE AMMONIA

FIELD OF THE INVENTION

This invention relates to methods for fixing atmospheric nitrogen, and more specifically, to methods for producing ammonia from moist air by means of a catalyst.

BACKGROUND OF THE INVENTION

Ammonia is commonly produced by heating nitrogen and hydrogen in the presence of a catalyst by the reaction $N_2 + 3H_2 \rightarrow 2NH_3$. Such catalysts include fused iron oxide, as in the Haber-Bosch and Claud methods, cyano-iron complex salts, as in the Mont Cenis method, and alkali metal-carbon complexes as in the method developed by Tamuri et al. and disclosed in U.S. Pat. No. 3,660,028 issued May 2, 1972.

The above reaction is reversible, contributing to low yields of product, and it is common to get a yield of ammonia of less than 40%. Because of the reversible nature and low productivity thereby caused, various techniques are employed to shift the reaction to the greater production of ammonia.

Commonly, the reaction of nitrogen and hydrogen is carried out at elevated pressure. Because four moles of gas produce two moles of product, the reaction is shifted to higher product formations at high pressures as a result of the Le Chatelier principle of chemical equilibrium. High pressure reactions necessitate suitable equipment and resulting expense.

In addition to high pressure, sorbents have been employed to adsorb the product ammonia, see e.g., U.S. Pat. No. 3,287,068 issued November, 1966 to R. P. Cahn. Sorbents shift the reaction to the ammonia product side by removing the product from the reaction zone and thus driving the reaction to completion. The use of sorbents, however, is disadvantageous not only in that sorbents involve additional expense, but in the fact that a further step may be necessary to remove the product from the sorbent. This can take the form of depressurizing the system in a cyclic pressurizing-depressurizing process or heating the sorbent-ammonia complex to very high temperatures to release the ammonia.

An obvious expense in producing ammonia from hydrogen and nitrogen is the cost of the reactant gases which require a considerable degree of purity, as small amounts of oxygen or carbon monoxide will poison many of the commonly used catalysts. Thus, even nitrogen so freely available, comprising approximately 80% of the atmosphere, is an expense in the nitrogen-hydrogen reaction.

It is desired to produce ammonia utilizing the nitrogen which composes such a large part of the atmosphere without expensive purification procedures. Furthermore, it is desirable to dispense with the need for diatomic hydrogen which cannot be readily found as such on earth and must itself be produced. The most accessible source of hydrogen in nature is water, and it is desirable to utilize water as the hydrogen source. As water vapor exists to some extent in air at all times, it is desirable to utilize atmospheric nitrogen and hydrogen from atmospheric water vapor to produce ammonia.

It is an object of this invention to produce ammonia utilizing atmospheric nitrogen and atmospheric water vapor. It is a further object to produce ammonia at room temperature and atmospheric pressure.

BRIEF DESCRIPTION OF THE INVENTION

It has been found that a dispersion of carbon in a medium of magnesium is an effective agent or catalyst to fix atmospheric nitrogen and utilize atmospheric water vapor to produce ammonia. A catalyst formed by melting a mixture of carbon and magnesium in inert atmosphere will, when cooled and exposed to moist air, produce ammonia.

The advantages of this method for producing ammonia are many and significant. Aside from the catalyst, the reactants are freely available in the air. The reaction can be carried out at room temperature and at atmospheric pressure, obviating the necessity for much expensive equipment. The need for sorbents or other means to remove end product ammonia during the reaction process is also eliminated.

DETAILED DESCRIPTION OF THE INVENTION

The instant invention relates to catalysts produced from magnesium and carbon and has the advantage that crude chemicals can be used to produce ammonia. The carbon used in this invention can be derived from any common source of carbon. Reagent grade carbon may be used, but it is not necessary. More important than the purity of the carbon is the surface area of the carbon. While coarse carbon may achieve satisfactory results, it may not perform as efficiently as finely divided carbon, and powdered charcoal is preferred.

The magnesium used may be of a high purity, but like carbon, purity is not essential. In fact, as discussed hereinafter, although magnesium is an essential ingredient of this reaction, the presence of other metals may be beneficial. Because magnesium is melted during the production of the catalysts, it is unnecessary that the magnesium be finely divided. It may be finely divided and mixed with the carbon before melting, but it may also be added to the reaction mixture in chunks before heating with the carbon. What is important is that, in one manner or another, the carbon be dispersed throughout the magnesium. If dispersion is not accomplished by an initial mixing of finely divided metal and carbon, it may be accomplished during the melting by agitating the melted mixture.

While the only necessary ingredients for the catalyst are magnesium and charcoal, the addition of other metals to the reaction may greatly enhance the yield. Two metals which have been found to enhance production of ammonia are aluminum and zirconium even though neither aluminum and carbon nor zirconium and carbon are effective without magnesium. However, the addition of aluminum and/or zirconium to the magnesium-carbon system greatly enhances ammonia production. In fact, aluminum may comprise the greatest weight percent of such a catalyst. In fact, a ratio of aluminum to magnesium of about 20:1 or even higher may effectively be employed.

The presence of zirconium, even in a small amount, i.e., 1 part per hundred by weight increases the production of ammonia. Zirconium in finely divided form may be added to the reaction mixture either as a metal or as zirconium oxide. The amount of zirconium when added as the metal, typically exceeds the solubility of zirconium in magnesium at the temperature employed. It should therefore be in a form which allows good dispersion and provides a large surface area to volume ratio. While zirconium even in very small amounts increases production of ammonia, the upper limit of zirconium to magnesium ratio has not been explored as such a high zirconium content catalyst is felt to be impractical due both to the expense of zirconium metal and to the necessity of heating such a mixture an extremely high temperature to disperse a large amount of zirconium by melting.

Although zirconium and aluminum have been specifically found to enhance the catalytic value of the magnesium-carbon product, other metals might also be used in conjunction with the basic magnesium-carbon catalyst system.

The preferred embodiment of this invention employs about 40 parts of aluminum to about two parts of magnesium, to about one part zirconium, to about one part carbon. If not otherwise stated, all "parts" and "percents" should be understood to be by weight. This embodiment has proved not only to be an effective catalyst for producing ammonia but is preferred as a cost-efficient catalyst. Aluminum being a readily available and inexpensive metal makes up the greatest part of the mixture. The dilution of magnesium and the dispersion of the zirconium by the aluminum provides efficient utilization of small amounts of magnesium and zirconium. Zirconium in small amounts relative to the other metals enhances ammonia production. Because zirconium is less available and hence more costly than aluminum or magnesium, it is cost-efficient to use zirconium sparingly. However, the invention may employ a mixture containing 10 to 50 parts magnesium to one part carbon. Further the invention may employ a mixture containing 30 to 50 parts by weight aluminum, one-half to 10 parts by weight magnesium, and one-tenth to 5 parts by weight zirconium to one part carbon.

For best results the mixture is heated in an inert atmosphere. Gases such as hydrogen, nitrogen, oxygen, carbon dioxide and carbon monoxide which may react with the melt at high temperature are evacuated. The procedure may be carried out in a high vacuum but requires special apparatus and the energy needed to create and maintain a vacuum. Additionally, significant amounts of magnesium may be lost through vaporization if the mixture is heated in a high vacuum. Inert gases, such as helium or argon, may instead be used. The preferred embodiment uses argon which has been found easier to work with in processes where the inert gas is to be recovered and reused.

The reaction mixture is heated above 651° C., the melting point of magnesium or above 660° C. for samples containing aluminum. To insure rapid melting of the metals so employed, as well as to best effect the reaction of magnesium and carbon, it is recommended that the temperature be at least 750° C. The temperature may be raised much higher, but as raising the temperature increases the energy cost, temperatures below 800° C. are suitable and preferred. The pressure at which this reaction is carried out is not considered important. As mentioned previously, it can be carried out in a vacuum, but it is simplest to use one atmosphere of inert gas obviating the necessity for special high or low pressure equipment and minimizing the volatilization of magnesium.

The reaction mixture should be maintained at its high temperature for a period of at least about two hours which allows the reactions to form the catalyst to take place. Maintaining the mixture at this temperature for more than six hours appears to have no particular advantage. While being heated it is desirable that the mixture be agitated to effect a thorough dispersion of carbon throughout the metal medium.

Although the precise character of the product has not been fully determined, carbon is dispersed throughout the metallic medium, and at least some of the carbon remains in its granular form although some may have reacted to form a carbide. Because hydrocarbons may be produced along with ammonia, magnesium carbide may be one of the products. Additionally, carbon-magnesium complexes may be formed. The role of aluminum and zirconium is not clear, but they may aid complexes of magnesium with carbon in ammonia producing or may complex with carbon in association with magnesium. In any event, the product formed with these additional metals is a more effective catalyst than a magnesium-carbon catalyst alone.

After being heated for the desired length of time, the melted dispersion of carbon in the metal is cooled to room temperature. Cooling takes place under the same atmosphere of inert gas so that the catalyst will not be poisoned with other gases.

A well known property of catalysts is that their effectiveness is increased by increasing the surface area which comes in contact with the reactants. The instant catalyst behaves similarly in that increased production of ammonia is effected with increased surface area, and the cooled melt is finely divided for use as a catalyst. Grinding the cooled melt is a suitable way to product a finely divided catalyst. A grind wherein the particle size is typically ten microns or less provides sufficient surface area. The grinding procedure, like the melting and cooling procedure, is preferably carried out under inert gas so as to prevent premature reaction of the catalyst with such gases or poisoning of the catalyst.

The catalyst so formed is removed from the inert gas atmosphere and introduced to moist air. While any moisture in the air will cause a reaction, relative humidity of at least thirty percent is desirable to form an appreciable amount of product. Preferably, the air introduced to the catalyst is previously humidified to bring the humidity at least about ninety percent.

One of the significant advantages of this method of ammonia production is the fact that, unlike conventional ammonia production, the gases may be handled at atmospheric pressure. Humid air requires no pressurizing equipment for introduction, but instead a simple air flow apparatus is adequate. Furthermore, this reaction takes place at room temperature unlike conventional ammonia production methods which require high temperatures. By room temperatures is meant about 20° C. The method so described can be used effectively at temperatures of 0° C. to about 50° C. While higher temperatures increase the reaction rate, any increased rate is balanced against the energy cost involved; moreover, a plant employing this process would not require special temperature controls.

The formation of ammonia by the catalyst is steady and needs only moist air. Moist air can be continually passed over the catalyst, and the ammonia so produced can be easily recovered. For example, the air exiting the catalyst may be bubbled through water to collect the ammonia as ammonium hydroxide.

The duration of usefulness of the catalyst have not been fully explored; such catalysts have produced ammonia for over a month. In addition to ammonia, hydrocarbons, such as ethane, may also be produced indicating decomposition of carbides present in the catalyst. The role of the carbides in ammonia production is not fully understood, and it is therefore uncertain what effect the depletion of carbides might have upon the catalyst. However, if and when the catalyst shows signs of limited productivity, it can be regenerated by remelting and adding more carbon. Even if it is necessary from time to time to remelt the catalyst with carbon to regenerate the catalyst, production of ammonia by this method is considered much more energy efficient than a process which requires the heating of hydrogen and nitrogen at high temperature and pressure. Furthermore, those competing processes which employ the heating of nitrogen and hydrogen at high temperature and pressure also require a catalyst and/or sorbents which must be regenerated at significant expenditure of energy.

EXAMPLE 1

About 33 grams of chunks of magnesium and about 1.25 grams of reagent grade powdered charcoal are thoroughly mixed. The mixture is put into a furnace which is subsequently evacuated and then filled with one atmosphere of argon. The mixture is heated to 750° C. and maintained at this temperature for a period of four hours. The melt so produced is cooled to solidify the dispersion of carbon in magnesium.

The solidified melt is granulated to form pieces not more than about 10 microns in size to increase to surface area to volume ratio. The granulated catalyst is placed in a reaction chamber, and moist air (about 40% R.H.) is introduced. The chamber is maintained at about room temperature, and after a period of about 24 hours, the gas stream leaving the chamber is analyzed by mass spectrometry and found to contain ammonia.

EXAMPLE 2

Approximately 20 grams of chunks of aluminum, about one gram of chunk magnesium, about ½ gram of very finely divided zirconium are mixed together with approximately ½ gram of powdered reagent grade charcoal. The ingredients are thoroughly mixed. The mixture is placed in a reaction chamber from which the air is evacuated by means of a vacuum pump. Thereafter, the atmosphere is replaced with argon at one atmosphere. pressure. The reaction chamber is placed in a furnace apparatus in which means are provided to agitate the contents. The reaction chamber and its contents are brought up to a temperature of 775° C. The temperature is maintained at 775° C. for sufficient time (about half an hour) for the aluminum and magnesium to melt. At this point, the reaction chamber is agitated to insure even dispersion of the carbon and zirconium particles throughout the melt. The melt is maintained at this temperature until the total time elapsed after reaching 775° C. is at least two hours. After cooling and while still under an argon atmosphere, the reaction mixture is ground into pieces of a size of about ten microns in diameter.

The ground catalyst is placed in a reaction chamber and moist air (90 percent R.H.) at one atmosphere pressure is introduced. After a period of 24 hours, the resultant gases are analyzed by mass spectrometry and found to include ammonia and ethane. On each succeeding date, fresh moist air is introduced into the reaction chamber, which procedure is repeated for a period of 30 days. Ammonia production continues throughout this period although there is a slight production of ammonia near the end of the period.

The catalyst can be remelted with powdered charcoal and regenerated. The catalyst is considered to provide a commercially feasible source of ammonia production.

Although the invention has been described with respect to certain preferred embodiments, it should be understood that changes and modifications as would be obvious to one having the ordinary skill of the art may be made without deviating from the scope of the invention which is defined solely by the appended claims.

Various features of the invention are emphasized in the claims which follow.

What is claimed is:

1. A process for synthesizing ammonia comprising:
   (a) making a mixture of carbon and magnesium metal,
   (b) forming a melt of said mixture by heating said mixture above the melting point of magnesium metal in an atmosphere substantially free of nitrogen,
   (c) cooling said melt to solidify same,
   (d) exposing said solidified melt to moist air to form ammonia, and
   (e) recovering the ammonia thereby produced.

2. A process according to claim 1 in which said mixture is heated in a vacuum or in an atmosphere of inert gas.

3. A process according to claim 2 in which said mixture also includes aluminum metal and zirconium metal.

4. A process according to claim 3 in which said mixture contains a ratio of 30 to 50 parts by weight aluminum, one-half to 10 parts by weight magnesium, and one-tenth to 5 parts by weight zirconium, to one part of carbon.

5. A process according to claim 2 in which said mixture also includes aluminum metal.

6. A process according to claim 2 in which said mixture also includes zirconium metal.

7. A process according to claim 2 in which said mixture contains a ratio of 10 to 50 parts magnesium to one part carbon.

8. A process for synthesizing ammonia according to claim 1 in which said solidified melt is exposed to moist air at a temperature of 0° to about 50° C.

* * * * *